(12) United States Patent
Alnajjar et al.

(10) Patent No.: US 12,308,788 B1
(45) Date of Patent: May 20, 2025

(54) AI-DRIVEN BIOMIMETIC CLUSTERED PHOTOVOLTAIC SYSTEM FOR ENHANCED SOLAR ENERGY GENERATION AND OPTIMIZATION

(71) Applicant: United Arab Emirates University, Al Ain (AE)

(72) Inventors: Fady Alnajjar, Al Ain (AE); Waleed Ahmed, Al Ain (AE); Mariam Khaled Mohammed Saeed Al Kuwaiti, Al Ain (AE); Shamma Salem Mohammed Khuwaidem Alneyadi, Al Ain (AE); Naser Bader Naser Mohamed Alsaedi, Al Ain (AE); Ahmed Khamis Saeed Saif Alshamsi, Al Ain (AE); Fatima Mohammed Ali Albaity, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/793,087

(22) Filed: Aug. 2, 2024

(51) Int. Cl.
*H02S 20/32* (2014.01)
*H02S 30/20* (2014.01)
(Continued)

(52) U.S. Cl.
CPC .............. *H02S 20/32* (2014.12); *H02S 30/20* (2014.12); *H02S 40/10* (2014.12); *H02S 40/425* (2014.12); *H02S 50/00* (2013.01)

(58) Field of Classification Search
None
See application file for complete search history.

(56) References Cited

U.S. PATENT DOCUMENTS

2021/0140150 A1* 5/2021 Navarro Alvarado .... E03B 3/02

OTHER PUBLICATIONS

Clifford et al., "Design of a novel passive solar tracker," Solar Energy, 2004, vol. 77, pp. 269-280.
(Continued)

*Primary Examiner* — Daniel P Malley, Jr.
(74) *Attorney, Agent, or Firm* — MH2 Technology Law Group, LLP

(57) ABSTRACT

There is disclosed an AI-driven biomimetic clustered photovoltaic (PV) system designed to maximize solar energy efficiency. Inspired by sunflowers, the system features autonomous intelligent PV clusters with radial and triangular panels that dynamically optimize sunlight absorption through biomimetic opening and closing mechanisms. Tri-axial tracking and 360-degree rotation ensure precise sun tracking, while smart microcontrollers enable real-time weather monitoring and panel adjustment. The system integrates a self-sufficient cleaning and cooling system using rainwater and ambient moisture. Electrical performance sensors and AI-driven 360-dome cameras detect faults and enhance security. Clusters collaborate via extendable wings and are segmented for independent movement and optimal sun exposure. Scalable and adaptable, the system supports hybrid solar-wind energy harvesting and employs genetic algorithms for continuous learning and self-optimization across diverse environmental conditions. This approach enhances maintenance efficiency, adapts to environmental changes, and optimizes panel configurations for maximum energy production, surpassing traditional methods in complex environmental contexts.

19 Claims, 14 Drawing Sheets

(51) Int. Cl.
*H02S 40/10* (2014.01)
*H02S 40/42* (2014.01)
*H02S 50/00* (2014.01)

(56) References Cited

OTHER PUBLICATIONS

Goetzberger et al., "Photovoltaic materials, history, status and outlook," Materials Science and Engineering R: Reports, 2003, vol. 40, pp. 1-46.

Mousazadeh et al., "A review of principle and sun-tracking methods for maximizing solar systems output," Renewable and Sustainable Energy Reviews, 2009, vol. 13, pp. 1800-1818.

Agarwal R., "Concept of Mechanical Solar Tracking System," IOSR Journal of Mechanical and Civil Engineering (IOSR-JMCE), e-ISSN: 2278-1684, p-ISSN: 2320-334X, 2014, pp. 24-27.

Serhan et al., "Two Axes Sun Tracking System: Comparsion with a Fixed System," Renewable Energy and Power Quality Journal, 2010, vol. 1, No. 8, pp. 79-84.

Cheng et al., "Biaxial-Type Concentrated Solar Tracking System with a Fresnel Lens for Solar-Thermal Applications," Applied Sciences, 2016, vol. 6, Article 115, 9 pages.

Iqbal et al., "Construction of Single Axis Automatic Solar Tracking System," International Journal of u- and e-Service, Science and Technology, 2015, vol. 8, No. 1, pp. 389-400.

Ghassoul M., "Design of an Automatic Solar Tracking System to Maximize Energy Extraction," International Journal of Emerging Technology and Advanced Engineering, 2013, vol. 3, Issue 5, pp. 453-460.

Ponniran et al., "A Design of Single Axis Sun Tracking System," The 5th International Power Engineering and Optimization Conference, IEEE, 2011, pp. 107-110.

Saxena et al., "A Versatile Microprocessor Based Controller for Solar Tracking," IEEE, 1990, vol. 2, pp. 1105-1109.

Tejwani et al., "360° Sun Tracking with Automated Cleaning System for Solar PV Modules," IEEE, 2010, pp. 2895-2898.

Oumarou et al. "Design Optimization and Performance Evaluation of a Single Axis Solar Tracker," Sustainable Energy, 2015, vol. 3, No. 1, pp. 9-13.

Kamala et al., "Solar Tracking for Maximum and Economic Energy Harvesting," International Journal of Engineering and Technology, 2013, vol. 5, No. 6, pp. 5030-5037.

Otieno, O. R., "Solar Tracker for Solar Panel," Project Report, University of Nairobi, Faculty of Engineering, Department of Electrical and Information Engineering, 2015, 61 pages.

Poulek V., "Testing the New Solar Tracker with Shape Memory Alloy Actors," IEEE, 1994, pp. 1131-1133.

\* cited by examiner

AI-DRIVEN BIOMIMETIC CLUSTERED PHOTOVOLTAIC SYSTEM FOR ENHANCED SOLAR ENERGY GENERATION AND OPTIMIZATION

FIELD OF THE INVENTION

The present invention relates to the field of photovoltaic (PV) systems, and more particularly to an advanced clustered PV system integrating biomimetic principles and artificial intelligence (AI) to optimize solar energy capture and efficiency.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

In today's world, researchers are tirelessly exploring energy sources that are clean, renewable, pollution-free, and have no adverse impact on global warming. Renewable energy, characterized by its inexhaustible nature and minimal environmental impact, has become a focal point of contemporary research and development. Solar energy is a prime example of such an energy source, embodying all these desirable qualities. Additionally, solar energy is abundantly available across nearly every region of the globe. However, efficiently harnessing solar energy presents several challenges, primarily due to environmental factors that significantly affect the efficiency of solar energy capture. The efficiency of converting solar radiation into electric energy remains relatively low due to the sun's changing position throughout the day and varying seasons. Thus, enhancing the efficiency of solar energy generation is a crucial and urgent issue. A practical solution to optimize solar energy capture is the implementation of solar tracking systems.

Photovoltaic (PV) panels are commonly used to convert solar radiation into electrical energy. These panels are typically installed on rooftops or in open areas near buildings and are traditionally fixed at an angle corresponding to the latitude of the location. This fixed orientation poses a significant challenge: to achieve optimal energy production, a solar panel must remain perpendicular to the sunlight throughout the day and across different seasons. Some users manually adjust the panels' direction seasonally to better align with the sun's position. Given the sun's movement across the sky, maintaining this optimal orientation with fixed panels is difficult, leading to suboptimal energy conversion and reduced efficiency. Therefore, the solution lies in employing a tracking system that adjusts the panel's position to remain orthogonal to the sunlight.

Research into prior arts reveal many approaches to overcome the challenges with conventional PV systems by involving the implementation of solar tracking systems. Solar tracking systems are designed to mechanically follow the sun's trajectory. These systems adjust the position of solar panels to maintain an optimal orientation relative to the sun, thereby increasing the efficiency of energy conversion. Research indicates that solar systems equipped with tracking mechanisms can be markedly more efficient than fixed solar systems, achieving efficiency gains of 30% to 60%. Among these systems, dual-axis tracking systems, which can adjust to the sun's position on both horizontal and vertical planes, demonstrate superior efficiency compared to single-axis tracking systems. Dual-axis trackers, tracking sunlight along both horizontal and vertical axes, are ideal for locations where the sun's position changes significantly throughout the year across different seasons. Conversely, single-axis trackers are more suitable for equatorial regions, where the sun's apparent position remains relatively stable throughout the year. The extent to which efficiency is improved by a tracking system depends on both the system's precision and the prevailing weather conditions. The efficiency gains are most pronounced in sunny conditions, which are optimal for the operation of tracking systems. Therefore, the choice and design of a tracking system must consider the specific geographical and climatic context to achieve the best possible performance and return on investment.

Existing solar tracking systems can be broadly categorized into passive and active systems, with configurations offering either one or two axes of freedom. Passive systems rely on the inherent properties of materials to adjust the panel orientation, while active systems use motors and sensors to achieve precise tracking. While dual-axis trackers offer higher efficiency by adjusting the panel orientation along both horizontal and vertical axes, they are also more complex and expensive. Single-axis trackers, on the other hand, are simpler and more cost-effective but provide lower efficiency gains.

Despite the efficiency gains provided by solar tracking systems, several challenges and limitations persist: High Maintenance Requirements: Solar tracking systems, especially those with dual-axis capabilities, are mechanically complex and require regular maintenance to ensure optimal performance. The moving parts in these systems are susceptible to wear and tear, which can lead to frequent breakdowns and increased operational costs. Environmental Susceptibility: The performance of solar tracking systems is heavily influenced by environmental conditions. Dust accumulation, strong winds, and adverse weather conditions can impact the efficiency and durability of these systems. Regular cleaning and maintenance are required to keep the panels free of dust and debris, which adds to the operational costs. Initial Investment: Solar tracking systems are more expensive to install than fixed solar systems due to their mechanical complexity and the need for additional components such as motors, sensors, and control systems. The higher initial investment can be a barrier for widespread adoption, particularly in cost-sensitive markets. Precision and Reliability: The efficiency gains from solar tracking systems depend on the precision with which the system can track the sun's movement. Inaccurate tracking can lead to suboptimal orientation and reduced energy capture. Ensuring high precision and reliability in tracking mechanisms is a significant challenge. Energy Consumption: Some solar tracking systems consume a portion of the energy they generate to power their motors and control systems. This energy consumption can offset some of the efficiency gains, particularly in less efficient systems.

Various investigations and solutions have been proposed to address these challenges. For example, some systems incorporate advanced actuator technologies, such as shape memory alloys or bimetallic strips, to improve tracking precision and reduce costs. Other solutions involve design approaches that allow solar panels to move in multiple directions, positioning mechanisms using heliostats or sensors, and software algorithms to achieve precise alignment with the sun's position. Integrated cleaning and cooling mechanisms have also been developed. However, these systems can be mechanically complex and prone to alignment issues, especially in adverse weather conditions. They require precise calibration and frequent updates to software algorithms to account for seasonal variations in the sun's path. Additionally, these systems are vulnerable to sensor malfunctions and environmental factors like dust, fog, or snow. The precise mechanical synchronization needed for these systems can lead to mechanical failures and increase both costs and maintenance requirements. Cleaning or cooling mechanisms add to the overall complexity and cost, and maintaining and refilling coolant can pose logistical challenges, particularly in remote installations. Despite these advancements, many existing solutions fall short in terms of long-term reliability, case of maintenance, and adaptability to different environmental conditions.

By addressing these needs, the next generation of solar tracking systems can significantly improve the efficiency and viability of solar energy as a renewable resource. Such advancements would contribute to a more sustainable and economically viable energy solution, helping to meet the growing global demand for clean and renewable energy sources. The development of a comprehensive, intelligent solar tracking system represents a crucial step towards achieving these goals and realizing the full potential of solar energy.

Based on the above explained, there exists a need for a more advanced and efficient solar panel system that optimizes the orientation of solar panels and capable of real-time adaptation to changing environmental conditions, with minimized maintenance requirements.

SUMMARY OF THE INVENTION

Therefore it is an object of the present invention to propose an advanced AI-driven, biomimetic clustered photovoltaic (PV) system that enhances solar energy efficiency by dynamically adjusting solar panel orientation, utilizing advanced tracking and control mechanisms, and integrating AI algorithms for real-time optimization based on environmental conditions, with minimized maintenance requirements.

There is disclosed a biomimetic, AI-driven clustered photovoltaic system for maximizing solar energy efficiency, comprising: a plurality of photovoltaic (PV) clusters, each cluster comprising a combination of radial and triangular solar panels arranged in a flower-like pattern; a sliding mechanism within each PV cluster for dynamically adjusting opening and closing of the solar panels based on sunlight conditions, mimicking movement of sunflower petals; a triaxial tracking system for each PV cluster, enabling vertical, horizontal, and rotational adjustments to optimize sunlight absorption; a smart microcontroller within each PV cluster for local control and optimization; and an AI-based control system employing a Genetic Algorithm (GA) to optimize panel orientation and operation based on environmental factors, wherein all the microcontrollers operate collaboratively under the Genetic Algorithm, which serves as a higher controller to achieve overall optimization across the system and is designed for continuous learning to adaptively respond to varying environmental conditions for maximum energy output.

In an embodiment of the present invention, the triangular solar panels of a PV cluster enhance the surface area for solar capture and utilize a shape memory ring and at least one torsional spring for independent dynamic adjustment to adopt different angles from the radial solar panels.

In an embodiment of the proposed system, the sliding mechanism controls degree of openness and inclination of the PV cluster to optimize the panels' positioning relative to the sun.

In another embodiment of the proposed system, the triaxial tracking system comprises a base motor enabling 360-degree rotation of the PV cluster.

According to the present disclosure, the GA optimizes panel angulation and positioning by considering multiple factors comprising sunlight, wind, dust accumulation, rainfall, heat, and power generation.

In an embodiment of the present invention, the smart microcontroller of a PV cluster communicates with other PV clusters to coordinate optimization across the system.

In another embodiment of the present invention, the system further comprises an AI-powered defect detection system comprising electrical performance sensors and machine learning algorithms for fault detection and predictive maintenance.

In another embodiment of the proposed system, the AI-powered defect detection system comprises an AI-powered 360-degree dome camera for fault identification through image processing as well as for security surveillance.

In an embodiment of the present invention, the system further comprising a self-sustaining cleaning and cooling system that uses collected water from ambient humidity, fog, and rainwater for maintenance.

In one embodiment of the proposed invention, each PV cluster further comprises extendable wings for inter-cluster cooperation and assistance.

According to the proposed disclosure, the PV clusters are scalable and adaptable for various applications, comprising portable units, large power generation systems and hybrid energy systems.

In an embodiment of the proposed invention, the GA optimizes configuration and distribution of the PV clusters within segments of a solar farm, with each segment can move or adjust independently for optimal sun exposure.

According to the disclosed invention, the PV clusters are capable of real-time environmental adaptation using the Genetic Algorithm.

In another embodiment of the invention, the system further comprises a gyroscope for each PV cluster to evaluate motor function and panel positioning by comparing the panel's actual position to its anticipated position from the GA higher-level commands for precise adjustments.

There is disclosed a method for optimizing solar energy absorption using a biomimetic, AI-driven clustered photovoltaic system, comprising: providing a plurality of PV clusters with a combination of radial and triangular solar panels arranged in a flower-like pattern within each cluster; dynamically adjusting opening and closing of the solar panels and their inclination using a sliding mechanism within each PV cluster, mimicking movement of sunflower petals; enabling vertical, horizontal, and rotational adjustments of each PV cluster via a triaxial tracking system; utilizing a smart microcontroller within each PV cluster for local control and optimization; employing a Genetic Algorithm (GA) within an AI-based control system to optimize panel orientation and operation based on environmental factors; implementing a self-sustaining cleaning and cooling system using collected ambient water for maintenance; and detecting defects in the panels using AI-powered sensing and image processing, wherein all the microcontrollers operate collaboratively under the Genetic Algorithm, which serves as a higher controller to achieve overall system optimization and is designed for continuous learning to adaptively respond to real-time environmental conditions for maximum energy output.

In an embodiment of the proposed method, the triangular solar panels independently and dynamically adjust to different angles from the radial solar panels, and each PV cluster rotates 360-degrees using a base motor for continuous sun tracking.

In an embodiment of the invention, the method further comprises facilitating inter-cluster cooperation and assistance through the use of extendable wings on the PV clusters.

In another embodiment of the invention, the GA optimizes configuration and distribution of the PV clusters within segments of a solar farm, allowing each segment to move or adjust independently for optimal sun exposure.

In another embodiment of the invention, the method further comprises evaluating motor function and panel positioning using a gyroscope for precise adjustments, wherein the panel's actual position is compared to its anticipated position as determined by the GA higher-level commands.

According to the present disclosure, wherein the GA considers multiple factors comprising sunlight, wind, dust accumulation, rainfall, heat, and power generation to optimize and adapt the PV clusters to real-time environmental conditions across the system, with the microcontrollers facilitating coordinated optimization among the PV clusters.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 8A shows a solar cluster integrated into a moving vehicle and operating in active mode with panels opened, and in safe mode with closed panels.

FIG. 8B shows a residential home equipped with the proposed solar cluster system.

FIG. 8C shows the solar system floating on the sea and utilizing self-powered monitoring stations.

DETAILED DESCRIPTION OF THE INVENTION

Figure 1A:
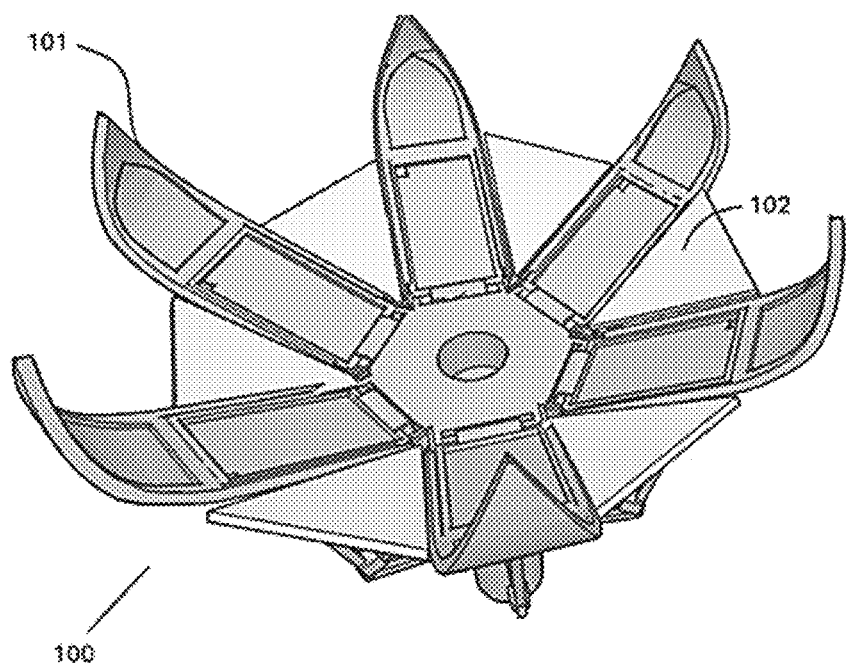
FIG. 1A shows the cluster solar system in operation, comprising two distinct types of solar panels: radial solar panels and triangular solar panels.

The aspects of the proposed AI-driven biomimetic clustered photovoltaic (PV) system for enhanced energy efficiency-according to the present invention will be described in conjunction with FIGS. 1-8. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention proposes an advanced AI-driven, biomimetic clustered PV system designed to maximize solar energy efficiency. Inspired by the sunflower, this biomimetic photovoltaic system features radial and triangular solar panels that dynamically adjust to optimize sunlight absorption while providing protection through an opening and closing mechanism. The system incorporates triaxial tracking for precise sun tracking and 360-degree rotation, managed by smart microcontrollers leveraging a Genetic Algorithm (GA) for optimization. The GA considers multiple factors such as wind, dust accumulation, power generation, and heat. The proposed invention is distinguished by its real-time environmental adaptation capability through the use of General Automation, allowing for evolutionary energy optimization as it responds dynamically to environmental changes. Additionally, it incorporates continuous learning to adapt to varying environmental conditions in real time and uses a gyroscope to evaluate motor function and panel positioning for optimal performance in varying conditions. The system also employs self-sustaining PV panels comprising an AI-powered defect detection feature and a water collection and storage mechanism for self-cleaning and cooling, further enhancing maintenance, durability, and efficiency.

Harnessing renewable energy sources like solar power is crucial for mitigating climate change and reducing our reliance on fossil fuels. Traditional PV systems, however, face limitations that constrain their energy production. Conventional panel designs restrict the sunlight conversion potential, and current monitoring and maintenance approaches are often labour-intensive, costly, and lack real-time optimization capabilities.

The proposed clustered PV system offers a transformative approach to solar energy generation. Autonomous intelligent PV clusters integrated with AI technology are utilized to achieve maximum energy yields and a self-optimizing, future-proof architecture. Inspired by nature, the biomimetic design enables each PV cluster unit to dynamically adapt its orientation and operation in real-time to match changing environmental conditions. This decentralized concept allows clusters to collectively coordinate and reconfigure themselves, continually improving overall performance through evolutionary processes and machine learning principles. To overcome the limitations of traditional PV systems, two key approaches are introduced here: 1. Designing PV clusters with their own controllers. 2. Implementing a smart distribution strategy for these clusters over large areas. Unlike rigid panel configurations, the biomimetic design allows individual PV units within each cluster to emulate a sunflower's ability to track and orient towards the sun, maximizing sunlight exposure throughout the day and significantly boosting energy capture. Additionally, self-monitoring and self-cleaning capabilities are incorporated in the system to ensure optimal performance without labour-intensive maintenance. The self-adaptive clustered architecture of the PV system, coupled with AI-driven optimization and self-learning capabilities, represents a groundbreaking solution for maximizing the adoption and efficacy of renewable solar energy. By combining biomimetic design principles, bio-inspired clustering, and AI-powered self-monitoring and adaptation, the system provides unprecedented energy yields, reduced maintenance costs, and unparalleled adaptability to diverse environmental conditions. This approach establishes the system as a future-proof solution, unlocking the full potential of solar power in the global transition towards a sustainable energy landscape.

In an embodiment of the present invention, the invention discloses AI-driven biomimetic clustered PV systems designed for maximum efficiency. The invention addresses the limitations of traditional PV systems by uniquely combining autonomous intelligent PV clusters integrated with AI technology and biomimetic design. Unlike traditional PV systems, the proposed invention mimics natural patterns to optimize the arrangement of PV clusters, significantly reducing shading and improving light absorption. This approach is coupled with advanced AI technology that autonomously adjusts and optimizes the clusters in real time based on environmental data, ensuring maximum efficiency. This level of dynamic optimization and predictive maintenance is achieved by the proposed system through the integration of biomimetic design and advanced AI-driven autonomy and is present in traditional systems. Further embodiments of the invention disclosed herein, emphasize biomimetic design principles and the use of AI for intelligent clustering and enhanced efficiency, utilizing a machine learning based solar tracking system that optimizes solar panel orientation using various sensors and a central tracking system to accurately follow the sun's movement.

In an embodiment of the invention, the system is capable of self-adjusting and optimizing in real-time, offering a more efficient and adaptive solution for harnessing solar energy. The integration of AI enables real-time adaptation and optimization based on environmental conditions, surpassing the structural adaptations of biomimetic designs. This invention leverages advanced technology to dynamically enhance control and efficiency, representing a significant advancement from merely using nature-inspired designs to incorporating intelligent systems capable of autonomous decision-making for energy optimization.

The significance of the claimed invention lies in its emphasis on real-time environmental adaptation using General Automation, extending beyond simple alignment optimization. The system dynamically responds and adjusts to environmental changes such as dust storms, extreme heat, and wind gusts. It incorporates continuous learning to enhance its responsiveness to varying conditions in real-time and uses a gyroscope for precise evaluation of motor function and panel positioning. These technical features ensure the system can maintain optimal performance under diverse and challenging environmental conditions, providing a more robust and adaptive solution compared to the static alignment optimization used in existing technologies.

The system employs biomimicry principles inspired by sunflowers, wherein an embodiment of the invention features a cluster design, comprising a combination of radial and triangular panels arranged in a flower-like pattern, mimicking or resembling the petals of a sunflower. Each PV cluster is composed of multiple PV panels. This sunflower-inspired cluster solar panel design offers a dynamic and efficient approach to capturing solar energy. In an embodiment, the biomimetic design mimics the opening and closing of sunflower petals, representing a specialized application of biomimetic principles distinctively focused on dynamic structural adjustments for optimized sunlight absorption. It introduces a kinetic element where solar panels not only mimic nature but actively respond to environmental stimuli, similar to how a sunflower adjusts to sunlight. In one embodiment, the design features a sliding mechanism on a central column that allows the radial solar panels to fan out or retract (opening/closing) based on sunlight conditions. This sliding mechanism acts like a lever, pushing the radial panels outward or retracting them into a compact state to optimize solar exposure. Triangular solar panels are provided to fill the gaps between radial panels, increasing the surface area and thereby maximizing solar collection area and efficiency. In another embodiment of the invention, the triangular panels use a sophisticated shape memory ring and torsional springs for independent control and precise adjustments, further enhancing surface area and efficiency. This dynamic adjustment feature represents a significant technological advancement over the fixed configurations of existing technologies, offering enhanced adaptability and efficiency in real-time solar energy harvesting. Additionally, this feature provides protection during adverse weather conditions.

Figure 2A:
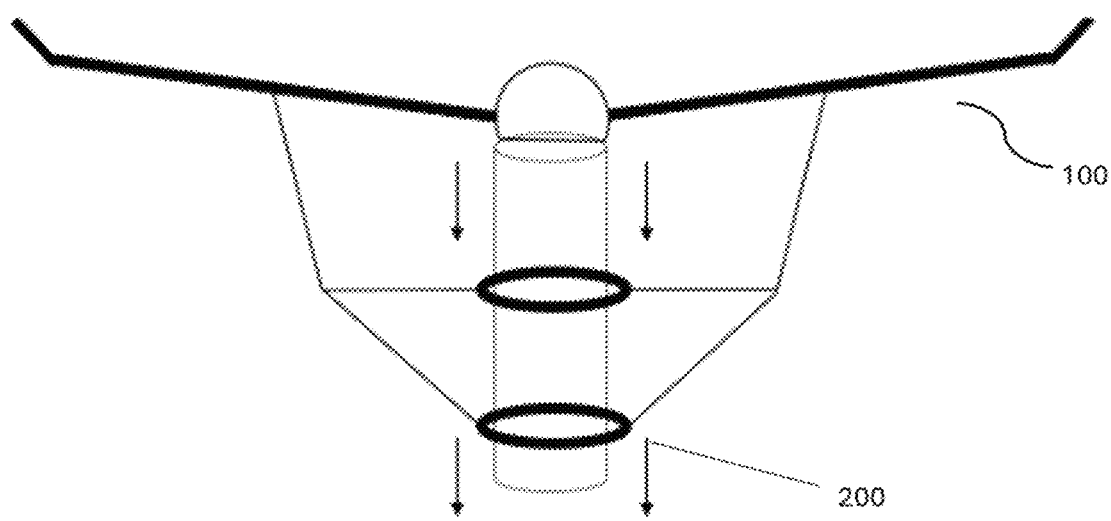
FIG. 2A shows the side view of a sunflower-inspired cluster solar panel system, when the sliding mechanism descends along the central column, it triggers the radial solar panels to fan out, resembling the petals of a sunflower opening towards the sun.
Figure 2B:
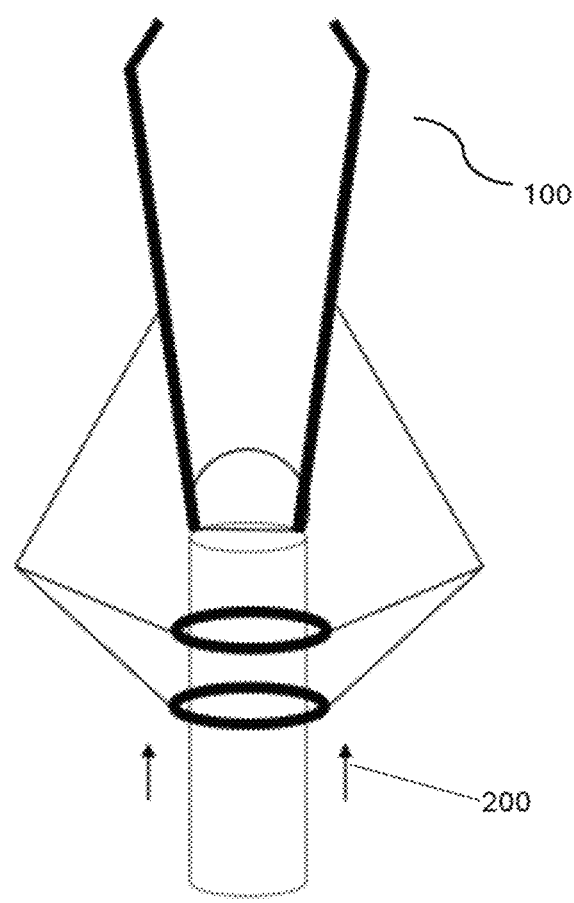
FIG. 2B shows the side view of the sunflower-inspired cluster solar panel system, when the mechanism ascends, it pulls the panels back into a closed, compact formation.

According to an embodiment of this disclosure, the solar panel cluster system incorporates several autonomous intelligent PV clusters, each comprising multiple PV panels. These clusters are biomimetically designed and utilize AI to dynamically adjust and optimize their configuration in real time based on environmental data, ensuring sustained maximum efficiency. The system thus leverages AI for predictive adjustments and optimization. In an embodiment of this invention, the panel configuration of the PV cluster system comprises two distinct types of solar panels: radial solar panels and triangular solar panels. In FIG. 1A illustrating the cluster solar system in operation, a PV cluster (100) is depicted with its radial solar panels (101) and triangular solar panels (102). The radial solar panels are centrally mounted on a central column, which houses an intricate sliding mechanism pivotal to the system's movement and functionality, facilitating the opening and closing of the solar panels. Referring to FIG. 2A-2E, which illustrate a sunflower-inspired cluster solar panel system and its movement mechanism, FIG. 2A shows the sliding mechanism (200) descending along the central column, triggering the radial solar panels to fan out, resembling the petals of a sunflower opening towards the sun. Conversely, FIG. 2B illustrates the mechanism ascending, and pulling or retracting the panels back into a closed, compact formation. This movement optimizes the panels' angle for maximum sunlight absorption in its opened mode and provides protection during adverse weather conditions by retracting the panels in its closed mode. The triangular solar panels complement the radial panels, which are strategically positioned to enhance the overall surface area exposed to sunlight. These panels work in conjunction with the radial panels, to ensure that the system captures sunlight from multiple angles throughout the day. Designed to fill the gaps between the radial segments, the triangular panels maximize energy efficiency and output, as depicted in FIG. 1A.

The sliding mechanism plays a pivotal role in the cluster solar panel system, designed to facilitate smooth and precise movement for seamless opening and closing of the panels. When the mechanism moves downwards or descending, it functions as a lever, extending the radial panels outward into their operational position. Conversely, when it moves upwards or ascending, it retracts the panels into a closed, compact state. This dynamic adjustment enables the solar panels to track the sun's movement across the sky, akin to a sunflower's natural sun-tracking behaviour, thereby optimizing the duration and intensity of solar exposure.

In another embodiment of the present invention, each PV cluster is designed in the likeness of a flower and incorporates triaxial tracking capabilities. A highly versatile mechanical system allows the panels to adjust in three different axes—vertical, horizontal, and rotational—providing a comprehensive range of motion that enhances precision in sun tracking. It enables the panels to accurately follow the sun's trajectory throughout the day with an exceptional level of precision. This multiaxial adjustability ensures optimal solar energy absorption throughout the day, ensuring optimal solar energy absorption regardless of the sun's position. The triaxial movement mechanism comprises a base motor equipped in the cluster system that enables 360-degree rotation, facilitating continuous orientation adjustments for optimal positioning at all times, surpassing the typical dual-axis adjustments found in current technologies. Additionally, the sliding mechanism incorporated within the system adjusts both the degree of openness and the inclination of the panels, offering a dynamic response to the sun's movement throughout the day. Another significant feature supporting triaxial tracking is the use of triangular solar panels, which are independently controlled for angle adjustment. This capability allows for finer adjustments in panel positioning, maximizing solar absorption efficiency by adapting to specific geometric configurations and spatial constraints more effectively than rectangular panels. This ability to adjust each panel independently for optimal angles significantly enhances the energy generation potential, compared to the basic integration of photovoltaics into building facades. In conjunction with 360-degree rotation, the sliding mechanism operates as a lever, extending radial panels outward or retracting them into a compact state as needed to optimize solar exposure and provide protection during adverse weather conditions. These combined features provide precise and versatile sun tracking, enhancing overall efficiency and adaptability to maximize solar energy capture.

Figure 2C:
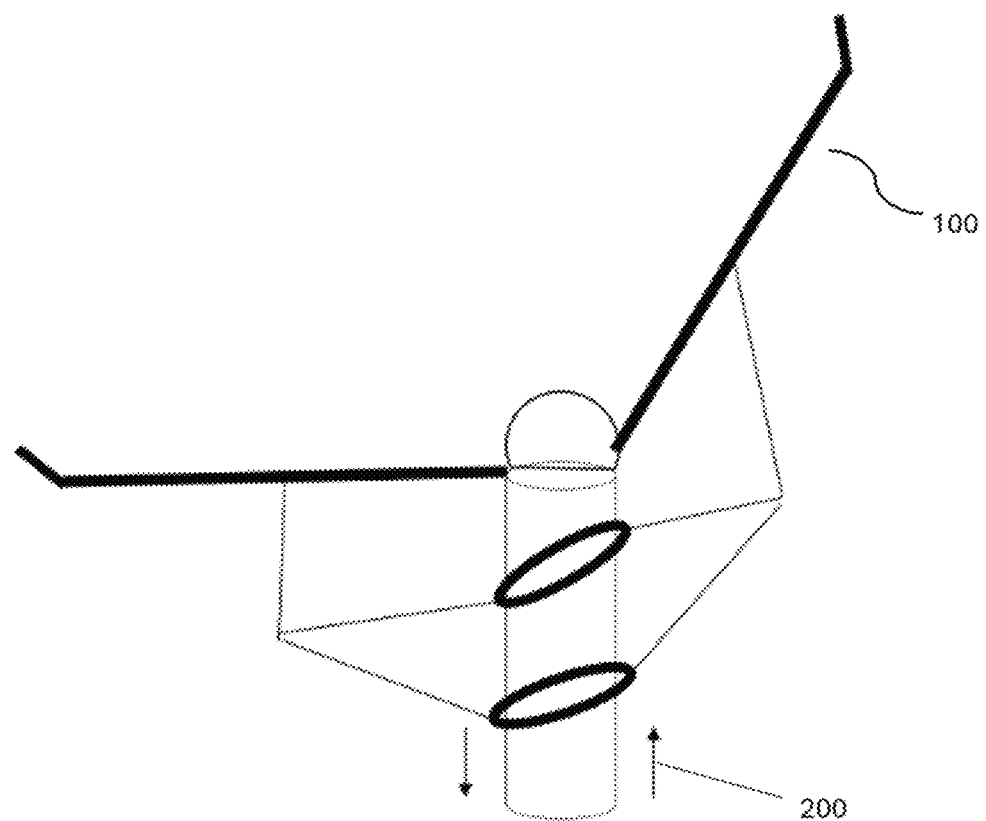
FIG. 2C shows the side view of the sunflower-inspired cluster solar panel system, the sliding mechanism being adjusted to control the degree of openness and inclination of the structure, further optimizing the panels' positioning relative to the sun's position.
Figure 2D:
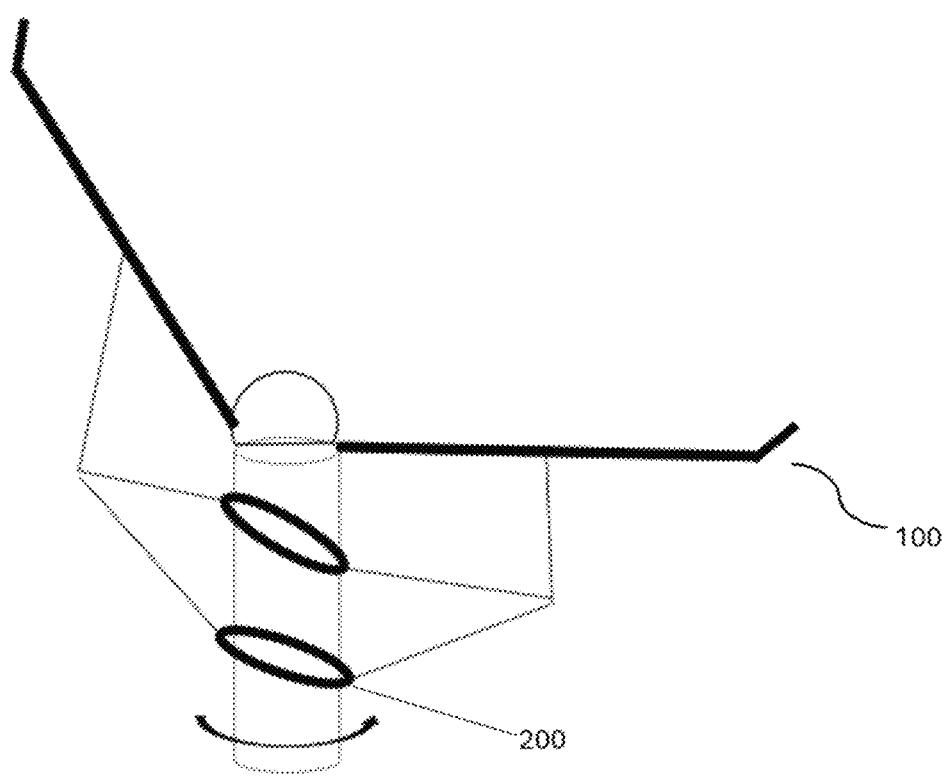
FIG. 2D shows the side view of the sunflower-inspired cluster solar panel system equipped with a base motor that enables 360-degree rotation, allowing the panels to move and face all possible sun directions throughout the day.
Figure 2E:
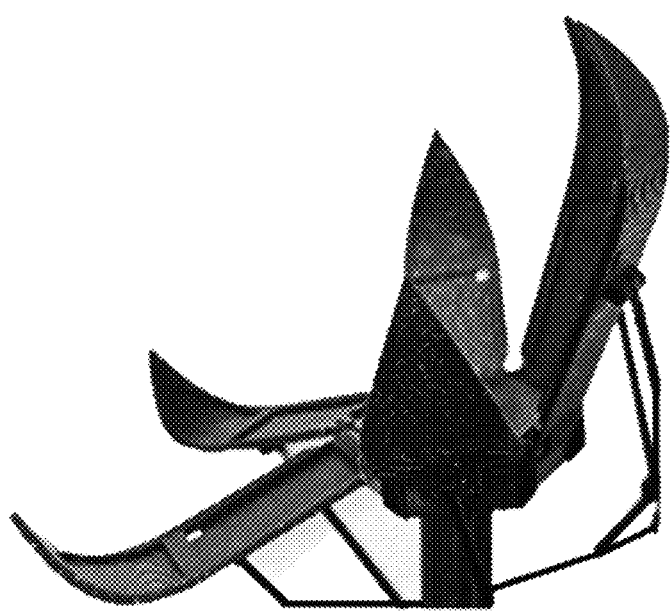
FIG. 2E shows a prototype of the cluster solar panel system open at a 45-degree inclination.

Referring to FIG. 2C, the sliding mechanism (200) can be adjusted to precisely control the degree of openness and inclination of the flower-like structure, further optimizing the positioning and angle of the panels relative to the sun's position in the sky. In FIG. 2D, the cluster system (100) is equipped with a base motor that enables 360-degree rotation, allowing the panels to move and dynamically face all possible directions of the sun throughout the day. This feature ensures that the panels are always optimally positioned to capture the maximum amount of sunlight. FIG. 2E shows a prototype of the cluster (100) open at a 45-degree inclination. The sunflower-inspired design offers numerous benefits: it maximizes sunlight exposure by maintaining optimal angles to the sun throughout the day, enhances energy capture efficiency, provides durability and protection through its retractable design that safeguards the panels from damage during storms or high winds, and presents an aesthetically pleasing and innovative approach to solar technology. In essence, the radial solar panel system embodies biomimicry in renewable energy technology, integrating biomimetic design with practical functionality to enhance solar energy capture and ensure panel protection.

Figure 1B:
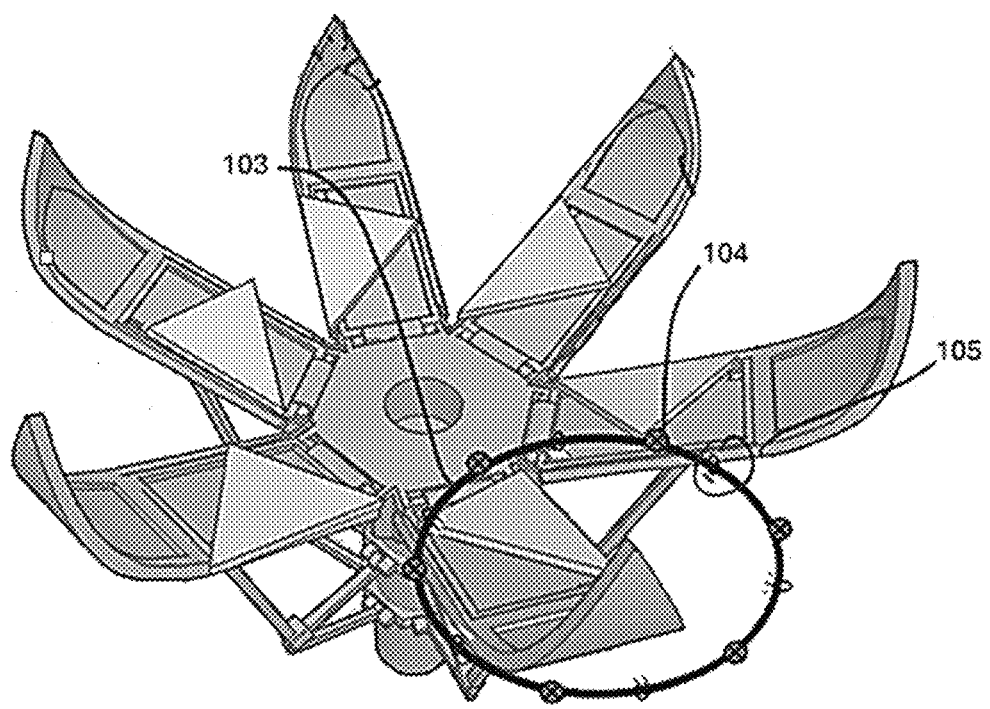
FIG. 1B and FIG. 1C show the detailed view of the triangular folded solar panel and the torsional hinge, which contributes to the dynamic adjustment of the triangular solar panels.
Figure 1C:
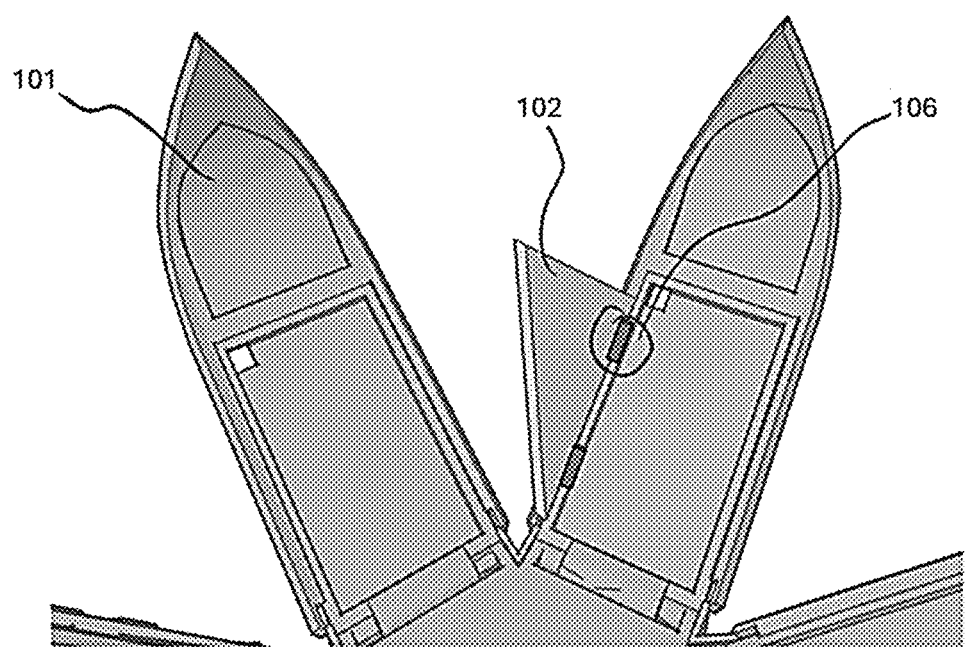

The triangular solar panels significantly enhance the overall surface area for capturing solar energy. These panels are uniquely designed to be independently controlled, allowing them to adopt different angles from the main radial solar panels. According to an embodiment of the system, this independent control is achieved through a shape memory ring, a sophisticated mechanism that enables precise adjustments to the positioning of the triangular panels. FIG. 1B and FIG. 1C together provide a detailed view of the triangular folded solar panel and the torsional hinge, which contribute to the dynamic adjustment of the triangular solar panels. FIG. 1C shows the main solar panel (radial) (101), the triangular folded solar panel (102) and torsional hinge (106). Each triangular solar panel is connected to the main radial panels via two active torsional springs. These springs are essential for maintaining the triangular panels in their operational mode. One edge of the triangular panels features an axial hinge (105) at the corner, which is crucial for the attachment and movement facilitated by the shape memory ring (103) as shown in FIG. 1B. This ring passes through a free circular hinge (104), allowing it to expand and retract seamlessly.

As the primary radial solar system begins to open, the torsional springs activate, extending the triangular solar panels outward. This expansion significantly increases the overall solar capture area, ensuring maximum energy absorption. Conversely, as the primary system prepares to close, the shape memory ring retracts, pulling the triangular panels back. This retraction neatly folds the triangular panels over the main radial panels, allowing the entire system to close compactly. This design not only optimizes energy capture but also ensures that the system can be safely stowed during adverse weather conditions, thus enhancing durability and longevity.

According to an embodiment of this disclosure, the control system for the PV clusters is designed to incorporate individual microcontrollers for each cluster, along with a GA for optimization. The GA operates by considering factors such as wind, dust accumulation, power generation, and heat to enhance system performance.

In an embodiment of the disclosed invention, each PV cluster is equipped with its own smart microcontroller with a Wi-Fi connectivity, functioning as the "brain" of the cluster. This microcontroller enables communication with other PV clusters and controls its own cluster. It ensures that the integrated PV panels are in optimal condition and generates maximum energy. Adopting a decentralized approach, the system assigns a smart microcontroller to each PV cluster, allowing localized monitoring and response to environmental conditions, such as weather changes, and optimizing panel performance more responsively and accurately. If the panels are not performing optimally, the microcontroller can autonomously initiate actions such as cleaning the panels or adjusting their orientation. Furthermore, the microcontroller monitors weather conditions in real time and adjusts panel positioning accordingly. In one embodiment, the smart microcontroller connects to the nearest panel based on previously learned patterns. It can also report new damage patterns detected, to the main operator for further action. In an embodiment of the system, the system uses a GA for optimizing panel angulation both locally and overall, across the system, as a method to increase the computational efficiency and effectiveness in finding the best angles for solar absorption. This method is particularly robust in dynamic environments and can evolve panel positions based on real-time data, potentially leading to superior optimization compared to systems using pre-set or less adaptive algorithms. Overall, the system emphasizes more granular and decentralized control, GA optimization, and an adaptive learning process, that offers significant improvements in flexibility, robustness, efficiency, and adaptability in managing PV clusters compared to centralized systems with less flexible control mechanisms. In further embodiments of the disclosed invention, the microcontrollers work both locally and collaboratively under a higher-level GA controller to achieve flexibility and overall optimization across the entire system. This allows the system to function independently as a single unit, and/or collaboratively as a swarm as well.

In another embodiment of the present invention, the system comprises an integrated self-sufficient cleaning and cooling system that utilizes water collected from various environmental sources. At the heart of each PV cluster, a self-sufficient cleaning and cooling system is installed to maintain the panels using water derived from sources such as ambient humidity, fog, and rainwater. The setup features a dedicated area on the panels for condensation, and in one embodiment, it employs a thermoelectric cooler to convert moisture into water. The system collects and stores condensed water or rainwater and is then used for cleaning the solar panels and watering plants. In another embodiment, the system employs an automated spraying system which derives its power directly from the solar panels for cleansing the panels. The automated system also actively cools the solar panels by spraying water, thus leveraging naturally available water sources to enhance maintenance and efficiency, thereby reducing reliance on external water supplies and cooling mechanisms.

Figure 3A:
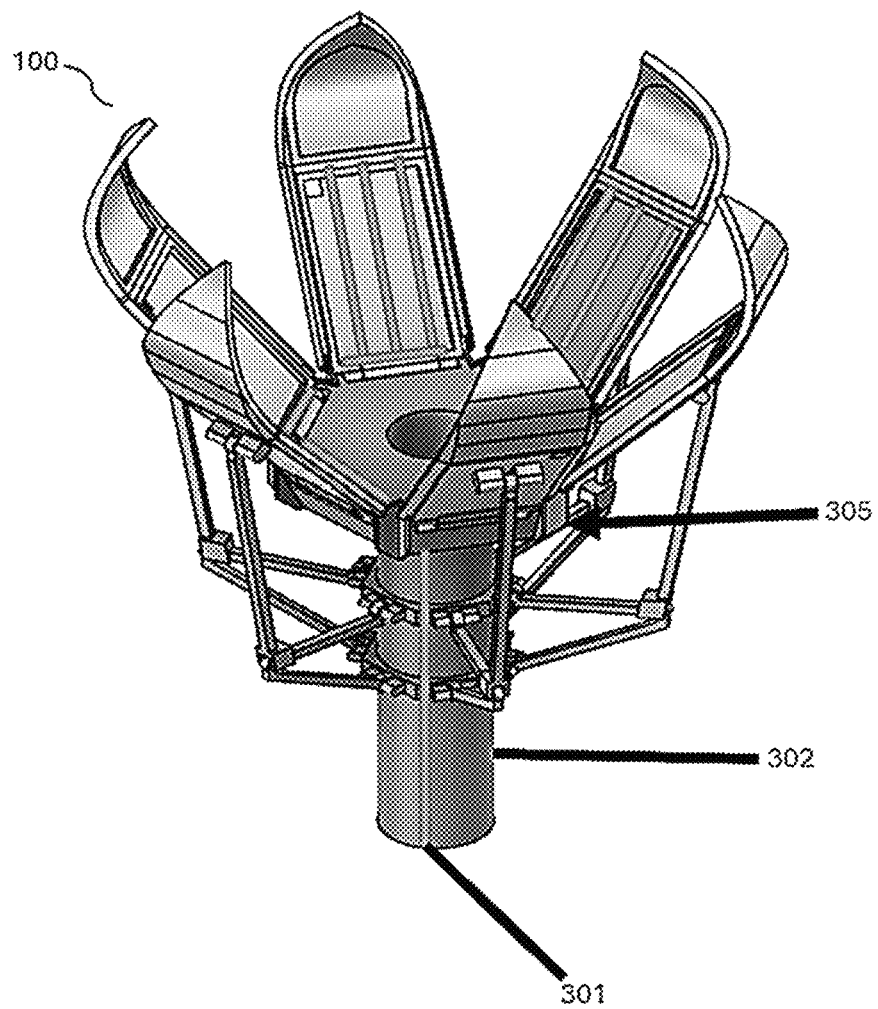
FIG. 3A and FIG. 3B show the solar PV cluster with self-cleaning and fault detection capabilities.
Figure 3B:
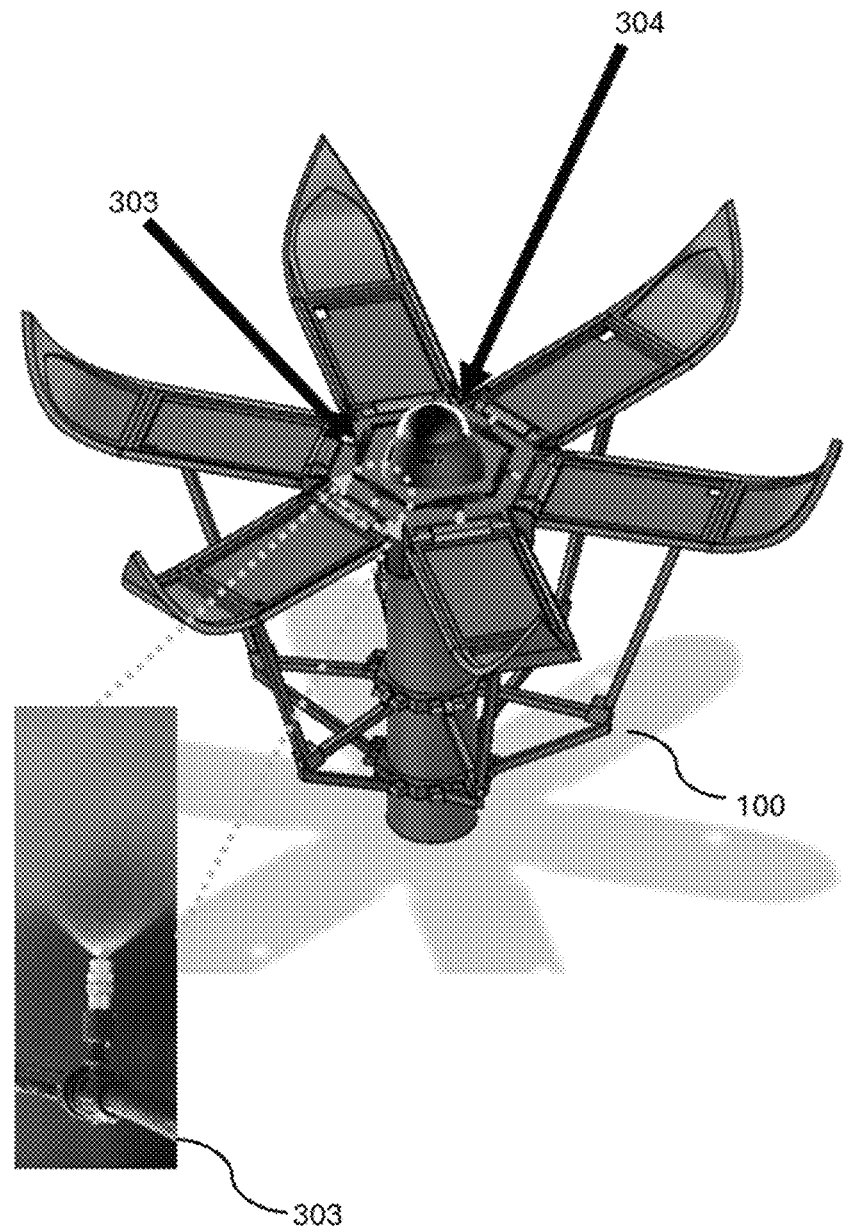

FIG. 3A and FIG. 3B illustrate the solar PV cluster (100) equipped with self-cleaning and fault detection capabilities. The system collects and stores rainwater for cleaning and cooling purposes of solar panels. FIG. 3A shows a pipe network (301) that serves dual functions: collecting rain waters and water derived from ambient humidity and fog; and cooling the solar panels using the collected water. The central cylinder (302) acts as a water storage system wherein the cylindrical bar stores the collected water for later use in cleaning and cooling the panels. FIG. 3B shows a high-pressure spraying spray (303) used for cleaning the panels. In an embodiment, the system employs an automated spraying system, powered directly by the solar panels, to clean or cool down the panels. The spraying tubes effectively cool down both the flat panels and the triangular panels when folded over the flat ones by spraying water on them. In another embodiment of the system, a 360° dome camera (304) is centrally located in the cluster to monitor the condition of the panels and detect any faults, such as dust or dirt on the panel surfaces. In an embodiment, the system is activated by sensors monitoring panel efficiency and ensures that it consumes minimal energy while upkeeping the panels' performance with little to no manual input. The cluster is equipped with a Wi-Fi-enabled microcontroller (305) for communication and control of the cluster. It enables localized monitoring and response to environmental conditions such as weather changes, and further optimizes panel positioning and performance more responsively and accurately. If the panels are underperforming, the microcontroller can autonomously initiate actions like cleaning the panels or adjusting their orientation. The remaining water after cleaning the panels is collected and filtered for use in watering plants beneath the panels. This eco-friendly design of the system, hence, effectively utilizes natural water sources and solar power, consuming minimal energy while maintaining optimal panel performance. It offers a sustainable solution for keeping solar panels clean, cool, and efficient.

In another embodiment of the present invention, the system incorporates mechanisms for comprehensive fault detection, monitoring of PV panels, and evaluation of panel performance and efficiency. The monitoring and fault detection system comprises electrical performance sensors, AI for fault detection, and machine learning algorithms. In one embodiment, the invention specifically integrates advanced sensors to monitor electrical performance and uses machine learning algorithms to detect faults in the panels. According to the disclosed system, electrical performance sensors are installed on each panel of the PV cluster. These sensors monitor the electrical output of the solar panels. A sudden drop in performance or irregularities in power output can indicate potential damage or breakage. Machine learning algorithms analyze data from these sensors, predict potential issues, and even differentiate between normal wear and tear versus actual damage.

In one embodiment, the system incorporates AI-powered image processing for fault detection using a 360-degree dome camera. Each PV cluster is equipped with an AI-driven 360-degree dome camera (as shown in FIG. 3B) at its center, that uses AI algorithms for panel fault detection through image processing. This feature allows the system to identify issues such as panel cracks, dust accumulation, or other factors that could reduce power generation. Over time, the AI algorithms learn from the detected incidents and implement proactive measures to prevent future occurrences. This intelligent capability enhances maintenance efficiency and reliability, ensuring that the PV system operates at peak performance and enables proactive predictive maintenance. Additionally, these cameras provide security and surveillance functions. These features of the system enhance its ability to ensure optimal performance, quickly identify and address issues, and maintain security, which extends beyond merely optimizing panel orientation.

Figure 4:
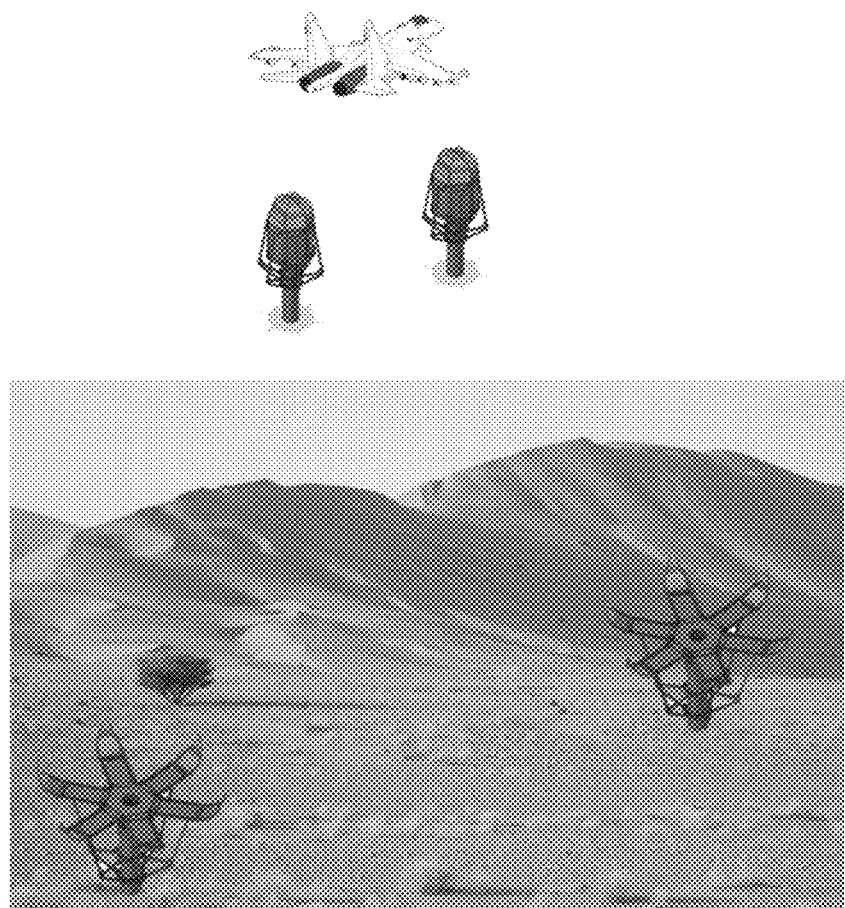
FIG. 4 shows a solar based portable radar.
Figure 5:
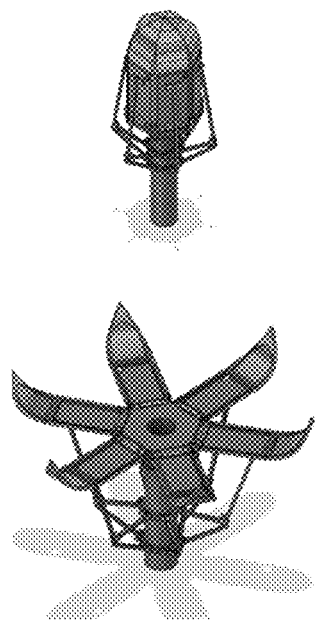
FIG. 5 shows an independent solar based system for irrigation.
Figure 5:
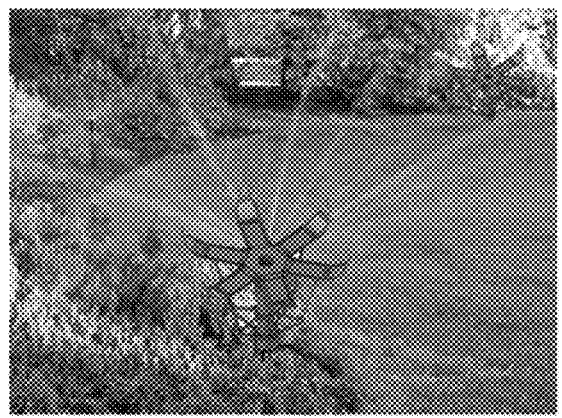

In another embodiment of the invention, the PV cluster is designed in various sizes to accommodate different applications. Its modular design is scalable and adaptable for various applications. This flexibility allows for customization, ranging from small portable units to large power generation systems. The cluster system can be used for individual unit uses, such as powering a solar-based portable radar (as shown in FIG. 4), an independent solar-based irrigation system (as shown in FIG. 5), or other similar single-device systems. Alternatively, the design can be scaled up for heavy-duty power generation, suitable for larger demands. This flexibility allows the PV clusters to be tailored to meet specific energy needs, whether for small-scale operations or more substantial power requirements. In an embodiment of the disclosure, referring to FIG. 4, the proposed PV clusters can be used as portable radars and deployed over large areas via air-borne methods, such as using an aircraft. The figure illustrates the process of landing of the PV clusters in large target areas after being ejected from an aircraft. After landing, each PV cluster blooms and operates as a separate radar system powered by solar energy. In another embodiment of the claimed invention, as shown in FIG. 5, the PV clusters can serve as independent irrigation modules forming an irrigation system wherein each cluster harnesses solar energy to generate power for its irrigation functionality. In an improved embodiment of the invention, the system is designed to be scalable and adaptable for future expansion and integration with General Automation, ensuring it can meet evolving energy needs and technological advancements.

Figure 6:
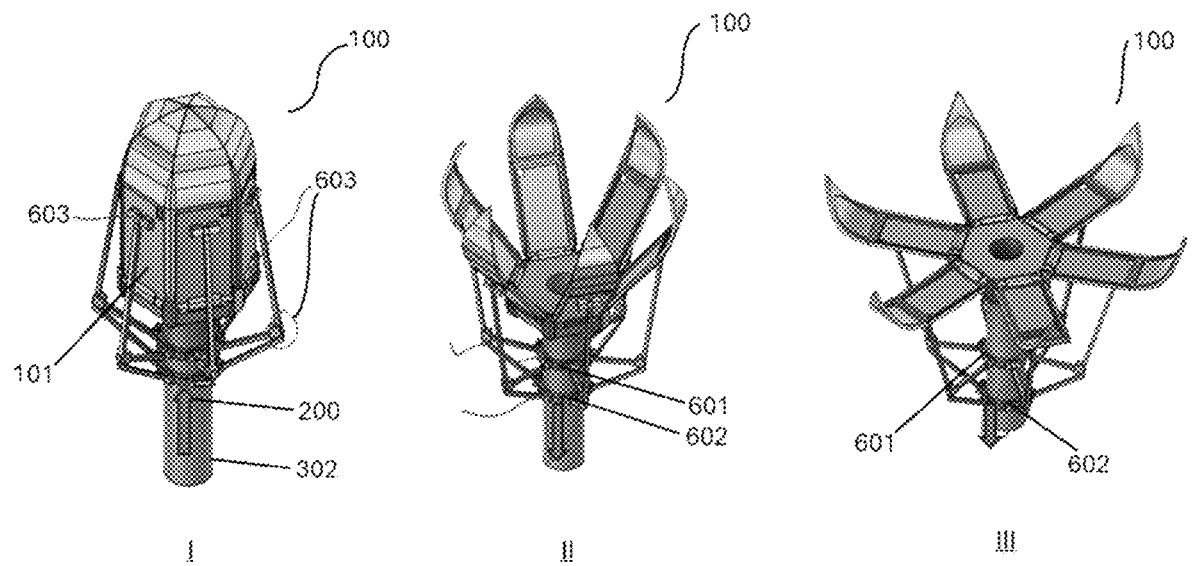
FIG. 6 shows an overview of the PV cluster system.

FIG. 6 provides an overview of the PV cluster system, illustrating its different modes of operation based on the degree of openness of the PV cluster (100): closed, semi-opened, and opened, represented as I, II, and III, respectively. The sliding mechanism (200), which adjusts the cluster's degree of openness, consists of two rings positioned around the central cylindrical bar (302) of the cluster. The upper ring is fixed (601), while the lower ring is movable (602) and can slide freely up and down the cylinder. A system of rods and hinges (603) connects the rings to the radial solar panels (101), facilitating the panels' movement in line with the sliding mechanism. When the movable ring moves upwards towards the fixed ring, the solar cluster system closes, corresponding to mode I. As the movable ring moves downwards and away from the fixed ring, it opens the radial panels, with the degree of openness proportional to the distance between the rings. This allows the cluster to achieve a semi-opened mode (II) and a fully opened mode (III), where the movable ring is at its maximum distance from the fixed ring.

According to the invention presented herein, the proposed system allows for customization to different sizes and applications and is designed to be adaptable for future expansion and integration with other renewable energy sources, such as wind, as well as hybrid energy systems. This provides a more versatile and comprehensive approach to renewable energy harvesting with General Automation. In an embodiment, the system is designed as a hybrid energy system, integrating both solar and wind hybrid energy harvesting. Each cluster system can be used for wind energy harvesting by adjusting the triangular and flat panels to create a hybrid energy system. Maximum wind energy can be harvested by adjusting the triangular panels in an optimized position along with optimized opening of the flat panels. The main vertical tube (cylinder) is free to rotate with respect to the mounting base.

Another embodiment of the system features inter-cluster cooperation, wherein extendable wings allow clusters to assist each other for enabling collaborative functionality. The invention enables the PV clusters to assist each other in case of individual component failures by incorporating extendable wings for inter-cluster assistance. According to the said embodiment, each PV cluster is equipped with integrated extendable wings, which allow it to interact with nearby clusters as needed. For instance, if a cluster has a defective motor, the neighbouring clusters can extend their wings to assist the damaged cluster, enabling it to move synchronously with the others. This collaboration mimics the movement of one large cluster, helping to maintain operational continuity and contributing to the overall efficiency of the system. This feature ensures that temporary faults in individual components do not significantly impact the system's performance.

Furthermore, the system enables real-time environmental adaptation by incorporating smart technology that monitors weather conditions and adjusts accordingly, much like sunflowers protecting themselves during unfavourable conditions. In an embodiment of the invention, the solar PV system adapts dynamically in real-time to environmental changes such as dust storms, extreme heat, wind gusts, and rainfall using a Genetic Algorithm (GA). This ensures optimal panel performance under varying conditions. The GA incorporated in the system is inherently designed for continuous learning, allowing it to adaptively respond to changing environmental conditions and ensuring the maximization of energy output. Drawing inspiration from biomimicry, the use of GA, leverages methodologies and processes observed in nature. This approach harnesses the efficiency and adaptability inherent in biological systems and applies these principles to the technological realm of solar energy harvesting. Through the emulation of natural strategies and mechanisms, the system achieves a harmonious balance between technological innovation and ecological intelligence for solar energy optimization.

In an embodiment of the present invention, each cluster is equipped with its own microcontroller to achieve local optimization, and all the microcontrollers work collaboratively under the GA as the higher controller (higher commands) to achieve overall optimization. The strategic use of GA in determining optimal solar panel angulation not only maximizes sunlight capture but also influences the overall design and positioning of the panels. This approach effectively reduces heat build-up and dust accumulation on the panels by controlling airflow, thereby contributing to the system's overall efficiency and longevity. This integration of bio-inspired optimization with advanced practical technological features marks a significant advancement in the field of solar energy technology.

In another embodiment of the claimed invention, the system features a gyroscope for evaluating motor function and panel positioning. Each cluster utilizes a gyroscope to assess the functioning and performance of each motor that controls the whole cluster. The gyroscope measures the panel's actual position against its anticipated position. This approach allows for a precise assessment of motor alignment and responsiveness, by accurately comparing the panel's present orientation to where it is supposed to be positioned, as derived from the higher-level commands. An improved embodiment of the system explores the system's scalability and adaptability to different sizes, offering flexibility for future expansion. It efficiently adjusts to varying energy demands, making it a versatile solution for evolving energy requirements. The size of the cluster system is adaptable to meet diverse energy needs and therefore, addition of more panels and their integration to the GA system is also possible in an aspect of the invention.

Figure 7:
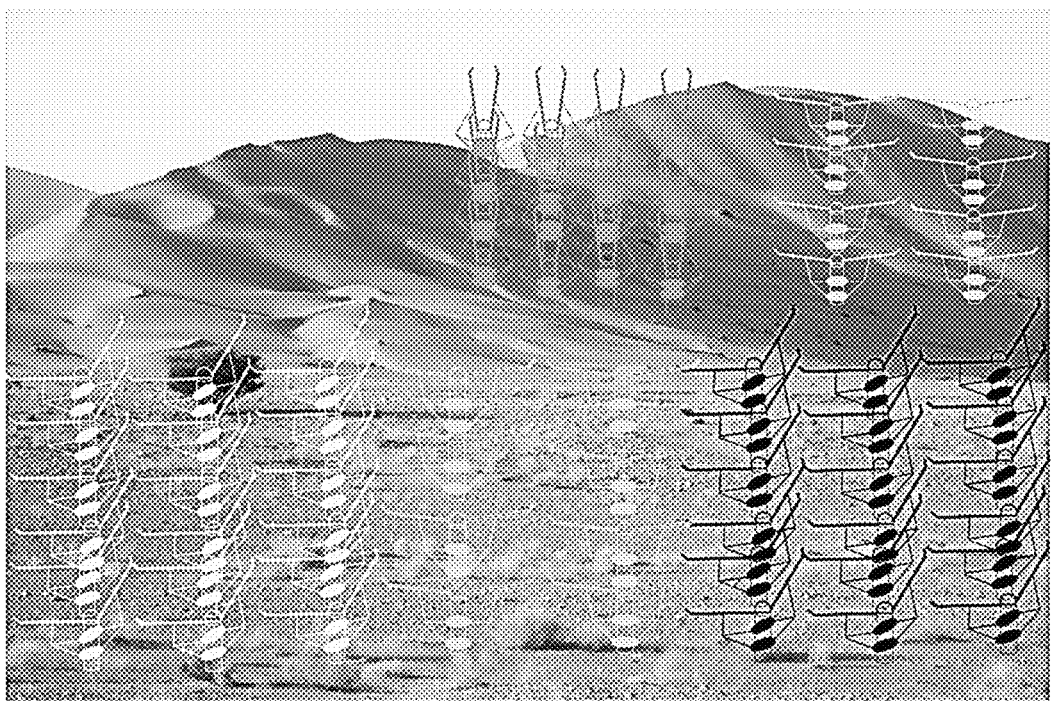
FIG. 7 shows an illustrative image depicting the potential for random distribution of solar panel clusters across vast areas, organized into distinct sectors or segments with each sector dynamically determining the optimal configuration based on the surrounding environment to maximize the total energy output from all sectors combined.

The proposed invention also discusses the self-optimizing solar panel system utilizing genetic algorithms to enable and to manage segment configuration and distribution. In one embodiment of the invention, the system divides the solar farm into segments (or sectors) of PV clusters, such that each segment can move or adjust independently for optimal sun exposure. This approach simplifies and streamlines operations by reducing the number of unique panel angles needed. When working on a large scale, the solar cluster system employs genetic algorithms to optimize the orientation, angle, and opening level of solar panels within each segment, with the goal of maximizing solar energy production while considering diverse environmental factors. The system is organized into segments, each comprising a group of solar panels that mimic each other's configuration. FIG. 7 is an illustrative image depicting the potential for random distribution of solar panel clusters across extensive areas, organized into distinct sectors (segments). Each sector dynamically determines the optimal configuration based on its surrounding environmental conditions, aiming to maximize the total energy output from all sectors combined.

Figure 8A:
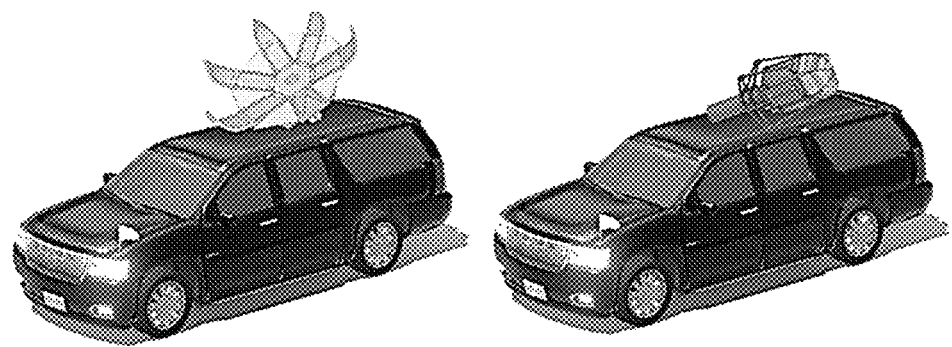
FIG. 8A-8C show the proposed solar cluster system design exemplifying the integration of advanced solar technology into everyday living environments, enhancing energy efficiency and sustainability.
Figure 8B:
Figure 8C:

The GA functions by treating each possible configuration of segment orientation, angle, and opening level as an individual within a population. The fitness of each individual is evaluated based on its solar energy output. Initially, the GA creates a randomly generated population of configurations. Over time, through a process of selection and evolution, the fittest individuals—those with higher energy production—are more likely to survive and reproduce, while less fit individuals (configurations) are gradually phased out. As the GA evolves or progresses, it explores a wide range of possible segment configurations, taking into account factors such as wind, dust accumulation, power generation, and heat. By continuously refining the population of configurations, the GA strives to identify the optimal arrangement of solar panel segments that maximizes overall energy production under prevailing environmental conditions. The GA's ability to simultaneously consider multiple factors and evolve toward increasingly effective solutions results in an efficient and optimized distribution of solar panel clusters. This approach adapts to the specific conditions of the installation site, potentially outperforming traditional design methods that may not account for the complex interplay of environmental variables. By leveraging the power of evolutionary computation, the proposed solar panel system aims to determine the best possible configuration for each segment, ultimately optimizing the performance of the entire solar array. This approach is highly effective for improving the efficiency and adaptability of solar energy systems in diverse settings. Different embodiments of the invention, illustrated in FIG. 8A-8C exemplify the proposed solar cluster system design integrating advanced solar technology into everyday living environments, promoting energy efficiency and sustainability. FIG. 8A shows a solar cluster integrated into a moving vehicle and operating in active mode with panels opened, and in safe mode with closed panels. FIG. 8B shows a residential home equipped with the proposed solar cluster system. FIG. 8C shows the solar system floating on the sea and utilizing self-powered monitoring stations to observe its surroundings.

According to the disclosed solution, the GA considers multiple factors simultaneously, comprising sunlight, wind, dust accumulation, power generation, and heat, to evolve towards increasingly effective solutions that adapt to specific site conditions. Consequently, the adaptation process involves not only monitoring sunlight to determine the directions of the clusters/segments but also factoring in wind, dust, and other environmental variables that can significantly impact performance. This comprehensive approach allows the system to: 1—Optimize panel configurations to reduce heat build-up and dust accumulation by controlling wind flow. 2—Adapt in real-time to environmental changes like dust storms, extreme heat, wind gusts, and rainfall, maintaining optimal panel performance under varying conditions. 3—Utilize the gyroscope in each cluster to precisely assess motor alignment and responsiveness, comparing the panel's actual orientation to its intended position based on higher-level commands. 4—Continuously refine the population of configurations to identify the optimal arrangement of solar panel segments that maximizes overall energy production under given environmental conditions. 5—Potentially outperform traditional design methods by accounting for the complex interplay of environmental variables specific to the installation site.

The proposed invention offers numerous advantages over current technologies: The biomimetic design inspired by sunflowers, enables dynamic GA-based tracking and optimal sun exposure. Triaxial tracking capabilities facilitate precise alignment with the sun's position throughout the day. The self-cleaning and cooling capability of the system utilizes ambient humidity and rainwater, with reduced maintenance costs. The system enables intelligent monitoring and fault detection using AI and machine learning algorithms. Collaborative functionality among clusters ensures continuous operation despite individual component failures. The system is scalable and adaptable to various sizes and applications, and it possesses hybrid solar and wind energy harvesting capabilities. The system utilizes genetic algorithms for self-optimization in segment configuration and distribution. By optimizing energy output, the system improves grid stability, thereby contributing to greater overall power grid stability.

The proposed invention is highly applicable to the renewable energy harvesting and energy management industries. Companies involved in renewable energy solutions, solar panel manufacturing, or smart energy management systems would find significant commercial interest in this invention. The PV clusters can be customized to meet specific energy needs and accommodate various applications. For instance, they can be used for individual unit applications like powering portable radars, solar-based irrigation systems, or other single-device systems. Alternatively, the design can be scaled up for heavy-duty power generation, making it suitable for larger energy demands. The proposed system is also adaptable for future expansion and integration with other renewable energy sources, such as wind, and supports hybrid energy systems like solar-wind energy harvesting.

An advanced embodiment of the invention involves developing a modular architecture for the solar panel clusters which simplifies maintenance and replacement of the individual components. This can reduce any complexity in design, manufacturing, and maintenance costs, and facilitates easier incorporation of advanced features and technologies into the system. A comprehensive cost-benefit analysis reveals that the system's enhanced efficiency and reduced maintenance requirements provide substantial long-term financial advantages, justifying the initial investment in advanced technologies like smart microcontrollers, AI-driven monitoring systems, and self-cleaning mechanisms. In a further embodiment, the system can be subjected to extensive testing and validation in various environmental conditions to ensure the long-term reliability, robustness, and durability of the system's advanced tracking, cleaning, and cooling mechanisms, guaranteeing consistent performance over time. The system also holds futuristic potential by partnering with experienced technology providers specializing in AI, machine learning, and optimization algorithms for seamless technology integration, smooth functioning, and compatibility of its advanced features, resulting in efficient and cohesive solar panel system.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A biomimetic, AI-driven clustered photovoltaic system for maximizing solar energy efficiency, comprising:
   a plurality of photovoltaic (PV) clusters, each PV cluster comprising a combination of radial and triangular solar panels arranged in a flower-like pattern;
   a sliding mechanism within each PV cluster for dynamically adjusting opening and closing of the radial and triangular solar panels based on sunlight conditions, mimicking movement of sunflower petals;
   a triaxial tracking system for each PV cluster, enabling vertical, horizontal, and rotational adjustments to optimize sunlight absorption;
   a microcontroller within each PV cluster for local control of each PV cluster; and
   an AI-based control system employing a Genetic Algorithm (GA) to control orientation of the radial and triangular solar panels,
   wherein all the microcontrollers operate collaboratively under the Genetic Algorithm.

2. The system of claim 1, wherein the triangular solar panels utilize a shape memory ring and at least one torsional spring for independent dynamic adjustment to adapt to different angles from the radial solar panels.

3. The system of claim 2, wherein the sliding mechanism within each PV cluster controls degree of openness and inclination of the flower-like pattern of each PV cluster to optimize positioning of the radial and triangular solar panels relative to the sun.

4. The system of claim 3, wherein the triaxial tracking system for each PV cluster comprises a base motor enabling 360-degree rotation of each PV cluster.

5. The system of claim 4, wherein the GA optimizes orientation and positioning of the radial and triangular solar panels by considering factors comprising sunlight, wind, dust accumulation, rainfall, heat, and power generation.

6. The system of claim 5, wherein the microcontroller within each PV cluster communicates with the plurality of PV clusters to optimize orientation of the radial and triangular solar panels within each PV cluster across the system.

7. The system of claim 6, further comprising an AI-powered defect detection system which comprises electrical sensors and machine learning algorithms for fault detection.

8. The system of claim 7, wherein the AI-powered defect detection system comprises an AI-powered 360-degree dome camera for fault identification through image processing.

9. The system of claim 8, further comprising a self-sustaining cleaning and cooling system that uses collected water from ambient humidity, fog, and rainwater.

10. The system of claim 9, wherein each PV cluster is capable of interacting and assisting a damaged PV cluster.

11. The system of claim 1, wherein each PV cluster moves and adjusts independently for optimal sun exposure.

12. The system of claim 1, wherein each PV cluster comprises a cleaning and cooling component with a dedicated area on the radial and triangular solar panels for condensation, and a thermoelectric cooler.

13. The system of claim 12, further comprising an automated spraying component which derives its power directly from the radial and triangular solar panels for cleansing the radial and triangular solar panels.

14. A method for optimizing solar energy absorption using a biomimetic, AI-driven clustered photovoltaic system, comprising:
   providing a plurality of photovoltaic (PV) clusters with a combination of radial and triangular solar panels arranged in a flower-like pattern within each PV cluster;
   dynamically adjusting opening and closing of the radial and triangular solar panels and their inclination using a sliding mechanism within each PV cluster, mimicking movement of sunflower petals;
   enabling vertical, horizontal, and rotational adjustments of each PV cluster via a triaxial tracking system;
   utilizing a microcontroller within each PV cluster for local control of each PV cluster;
   employing a Genetic Algorithm (GA) within an AI-based control system to optimize orientation of the radial and triangular solar panels;
   implementing a self-sustaining cleaning and cooling system using collected ambient water; and
   detecting defects in the radial and triangular solar panels using AI-powered sensing and image processing,
   wherein all the microcontrollers operate collaboratively under the Genetic Algorithm.

15. The method of claim 14, wherein the triangular solar panels independently and dynamically adjust to different angles from the radial solar panels, and each PV cluster rotates 360-degrees using a base motor within each PV cluster for continuous sun tracking.

16. The method of claim 15, wherein each PV cluster moves and adjusts independently for optimal sun exposure.

17. The method of claim 14, wherein each PV cluster is capable of interacting and assisting a damaged PV cluster.

18. The method of claim 15, further comprising evaluating the function of each base motor within each PV cluster and radial and triangular solar panel positioning using a gyroscope and comparing an actual position of the radial and triangular solar panels to an anticipated position as determined by the GA.

19. The method of claim 18, further comprising cleansing the radial and triangular solar panels using an automated spraying component which derives its power directly from the radial and triangular solar panels.

* * * * *